(12) United States Patent
Van Doren et al.

(10) Patent No.: US 8,090,642 B1
(45) Date of Patent: Jan. 3, 2012

(54) OPTION COMPUTATION FOR TANGIBLE DEPRECIATING ITEMS

(75) Inventors: Jade Van Doren, Manhattan Beach, CA (US); Marc Adam Lebovitz, Tarzana, CA (US)

(73) Assignee: TechForward, Inc., Los Angeles, CA (US)

( * ) Notice: Subject to any disclaimer, the term of this patent is extended or adjusted under 35 U.S.C. 154(b) by 812 days.

(21) Appl. No.: 11/707,361

(22) Filed: Feb. 16, 2007

Related U.S. Application Data

(60) Provisional application No. 60/774,535, filed on Feb. 17, 2006.

(51) Int. Cl.
*G06Q 40/00* (2006.01)

(52) U.S. Cl. ............................................. 705/37; 705/35

(58) Field of Classification Search ...................... 705/37
See application file for complete search history.

(56) References Cited

U.S. PATENT DOCUMENTS

| | | | | |
|---|---|---|---|---|
| 7,542,932 | B2 * | 6/2009 | Chalermkraivuth et al. ... | 705/35 |
| 7,668,774 | B1 * | 2/2010 | Hodgson ......................... | 705/37 |
| 2002/0032615 | A1 * | 3/2002 | Ikeda .............................. | 705/26 |
| 2002/0077835 | A1 * | 6/2002 | Hagelin .......................... | 705/1 |
| 2002/0082849 | A1 * | 6/2002 | Tenorio .......................... | 705/1 |
| 2002/0198819 | A1 * | 12/2002 | Munoz et al. ................... | 705/38 |
| 2003/0110111 | A1 * | 6/2003 | Nalebuff et al. ................ | 705/35 |
| 2004/0139041 | A1 * | 7/2004 | Grichnik ......................... | 706/21 |
| 2004/0148241 | A1 * | 7/2004 | Qi et al. .......................... | 705/36 |
| 2005/0216384 | A1 * | 9/2005 | Partlow et al. .................. | 705/35 |
| 2006/0015364 | A1 * | 1/2006 | Hays .............................. | 705/1 |
| 2006/0116942 | A1 * | 6/2006 | Woyke ............................ | 705/35 |
| 2007/0043660 | A1 * | 2/2007 | Kass et al. ...................... | 705/38 |
| 2007/0156563 | A1 * | 7/2007 | McGill ....................... | 705/36 R |
| 2010/0036765 | A1 * | 2/2010 | Hecht ............................. | 705/37 |

* cited by examiner

*Primary Examiner* — Jagdish Patel
*Assistant Examiner* — Kevin Poe
(74) *Attorney, Agent, or Firm* — Blakely Sokoloff Taylor & Zafman, LLP

(57) ABSTRACT

A system for computing option prices for tangible depreciating items is described. Describing information of the tangible depreciating item is determined. Historical sales data of sold tangible depreciating items from marketplaces are collected. A present resale value of the tangible depreciating item is computed based on the historical sales data. A depreciation rate of sold tangible depreciating items having similar attributes as the tangible depreciating item is extrapolated from the historical sales data. A predicted resale value of the tangible depreciating item is computed based on the computed present resale value and on the extrapolated depreciation rate.

18 Claims, 14 Drawing Sheets

OPTION COMPUTATION FOR TANGIBLE DEPRECIATING ITEMS

RELATED APPLICATIONS

This application claims the benefit of U.S. Provisional Application No. 60/774,535 filed on Feb. 17, 2006.

TECHNICAL FIELD

This invention relates to the field of options computation and, in particular, to computing and selling options on tangible depreciating items.

BACKGROUND

Current methods of recouping the value of tangible depreciating items such as computers and electronic devices have limitations. Customers currently buy these items, and subsequently want to recoup value from the items when they are done with them. One reason they might be done with a tangible depreciating item is that they want to upgrade to a new item of the same or similar type. This process can be expensive, fraught with uncertainty, and full of hassles.

If the customer does not sell their old item, but rather disposes of it in a manner that does not provide monetary value, then the upgrade process is seen as expensive. Some customers try to sell their items on a secondary market and use the value recouped from the old item to bring down the cost of their purchase of the new item. However, prices received on secondary markets for used tangible depreciating items are difficult to predict, and selling items on a secondary market can entail a lot of work that many people would like to avoid.

Current solutions to these problems include trade-in programs, which take some of the work out of recouping the value from an item when a person is ready to upgrade. However, such a solution does not inform the person of the future trade-in value at the time the item is originally sold to the person. Customers desire more certainty in the future trade-in value of their items to understand their total cost of ownership for the item over various periods, and minimize that total cost of ownership through item selection.

Currently there is no solution for locking in the future resale value of tangible depreciating items, which would involve selling a put option or forward contract where the underlying asset is a tangible depreciating item. Exchange traded options and forwards are sold for underlying assets that are either non-tangible or do not depreciate, even though their prices may fluctuate. Pricing these options and forwards does not involve some key processes that are necessary for pricing options on tangible depreciating items. These key missing processes include predicting the item's future sale price, predicting the rate of option exercise, and accounting for costs related to offering the service.

Given the current demand for upgrading tangible depreciating items more easily, affordably and frequently, and the limitations in the prior approaches, an approach for taking some of the uncertainty out of resale prices for these items is highly desirable. In particular, an approach that allows for the customer to be assured of the future resale value of their depreciating goods at the time of original sale is highly desirable.

There is a further need for an approach for making the return of these items easy for the customer and the provider of the service through shipping and grading processes.

There is yet a further need for an approach for making the upgrade process for tangible depreciating items more convenient and flexible to consumers than conventional approaches.

There is a yet further need for an approach for aiding customers in selection of tangible depreciating items based on the items' future resale values.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Figure 1:
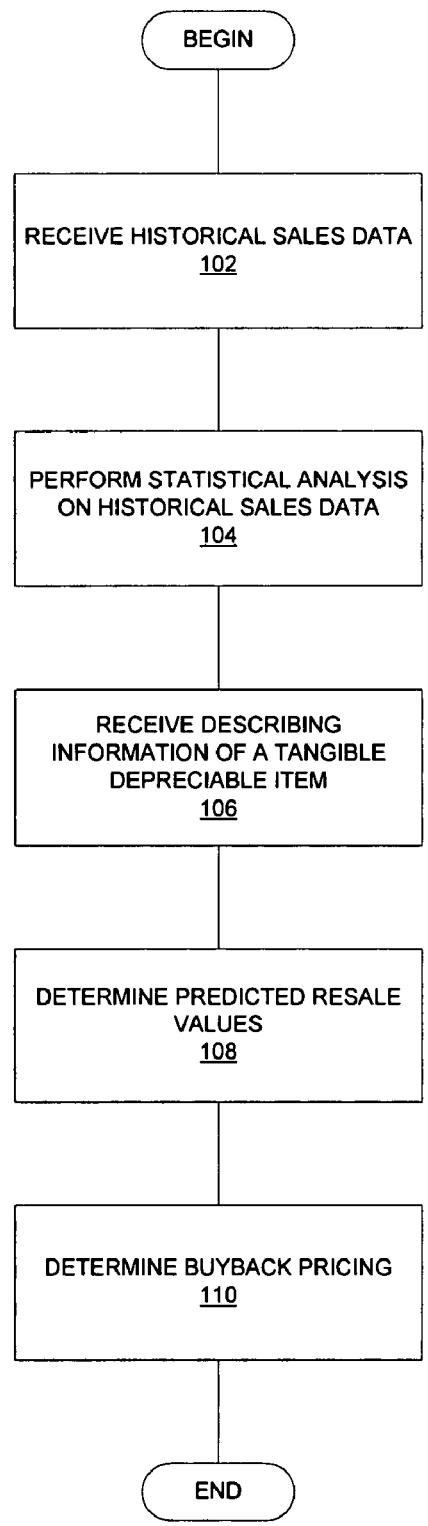
FIG. 1 is a flow diagram illustrating one embodiment of a method for computing a buyback option on a tangible depreciating item.

FIG. 1 is a flow diagram illustrating one embodiment of a method for computing an option, such as a buyback option, on a tangible depreciating item. It should be noted that tangible depreciating items include items that depreciate over a relatively long period of time. For example, consumer electronic devices such as computing devices, laptops, digital cameras, digital audio players, or flat screen televisions are considered to be tangible depreciating items. Although the resale value of some tangible depreciating items may fluctuate over a brief period of time, these items may still be considered tangible depreciating items because their resale value decreases over a relatively longer period of time. For example, the resale value of a newly released cell phone, MP3 player, or video game system may increase over a short period of time due to its popularity and/or supply shortage. However, these popular items may still be considered tangible depreciating items because they depreciate over a relatively longer period of time.

At 102, historical sales data are gathered from various sources (e.g. online and offline auction marketplaces, used goods marketplaces, new goods marketplaces, or internet auction sites). Historical sales data may include data on past sales of tangible depreciating items of the same type as the tangible depreciating item for which the buyback option is being computed. The data may include various attribute configurations. For example, if a tangible depreciating item for which a buyback is being computed is a laptop, the historical data may include data on sales of various laptops with various types of microprocessors, various amounts of hard disk space, etc. For each sale, the data may include, but is not limited to, the sale price, the sale date, and information describing the item sold.

At 104, statistical analysis is performed on the historical sales data. In accordance with one embodiment, the statistical analysis is performed to determine a valuation pattern of sold tangible items based on historical sales data. A valuation pattern may includes past and future trends. Those of ordinary skills in the art will recognize that the statistical analysis may include methods commonly used such as hedonic analysis, non-linear regression, and vector auto-regression among others.

At 106, description information about the particular tangible depreciating item for which the buyback option is being computed is received. For example, if the item is a laptop, the describing information may include its brand and model number. In addition or alternatively, the describing information may be its configuration of attributes. The attributes, for example with a laptop, may include the size of it hard disk, the type of microprocessor in its system, etc.

At 108, the predicted resale values are determined for various points and/or periods of time in the future. Given the statistical analysis that was performed at 104 and the describing information of the tangible depreciating item at 106, the predicted resale values for the tangible depreciating item can be determined. One method for predicting the resale values is further described with respect to FIGS. 3A, 3B, and 3C.

Figure 2:
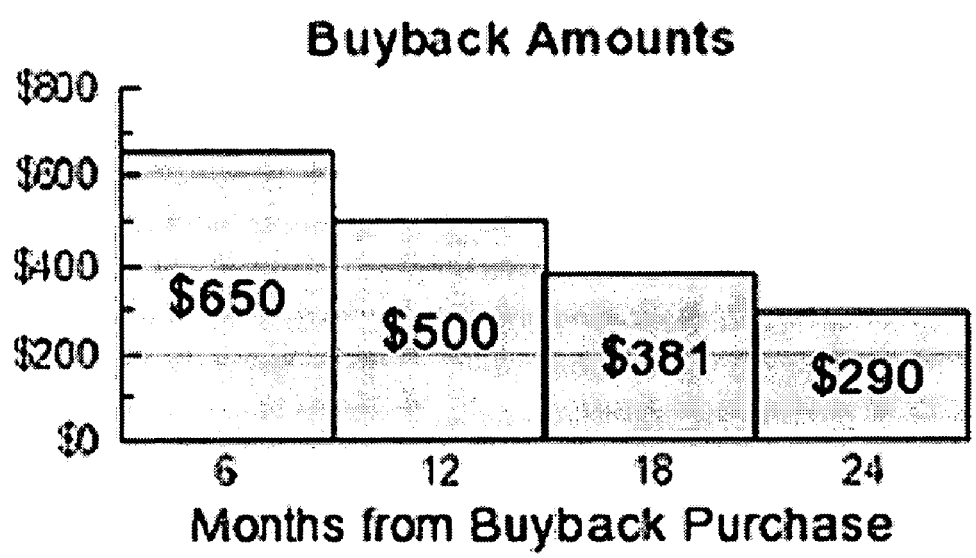
FIG. 2 is a graph diagram illustrating various exercise amounts for a tangible depreciating item over several periods of time.

The buyback pricing is determined at 110. The buyback pricing may include the purchase price of the option and the exercise price of the option. The purchase price of the option may include an upfront fee that a customer pays at a present time to secure the right to exchange his tangible depreciating item in the future. The exercise price of the option may include an amount paid to the customer in exchange for his tangible item according to a predetermined payout schedule as illustrated in FIG. 2. The computation of both the purchase price and exercise price is further described below.

FIG. 2 is a graph diagram illustrating various values of exercise amounts (also called buyback amounts) for a tangible depreciating item over several predetermined periods of time. A customer wishing to sell his tangible depreciating item, for example, a laptop computer, within the first six months of purchasing the put option may be eligible to receive $650. However, that customer will only be paid $290 if he exchanges his laptop between the $18^{th}$ month and the $24^{th}$ month from the time of purchase of the put option. As illustrated, the value of the laptop decreases over periods of time. In accordance with one embodiment, a customer exchanging his laptop anytime in one of the predetermined period will receive an amount associated with that predetermined period as illustrated above. In accordance with another embodiment, a customer exchanging his laptop anytime prior to a commitment period will receive an amount associated with the last period of the commitment period. For example, a customer purchasing a put option for 24 months commitment may only receive $290 at anytime the laptop is exchanged prior the end of the 24 month.

Figure 3A:
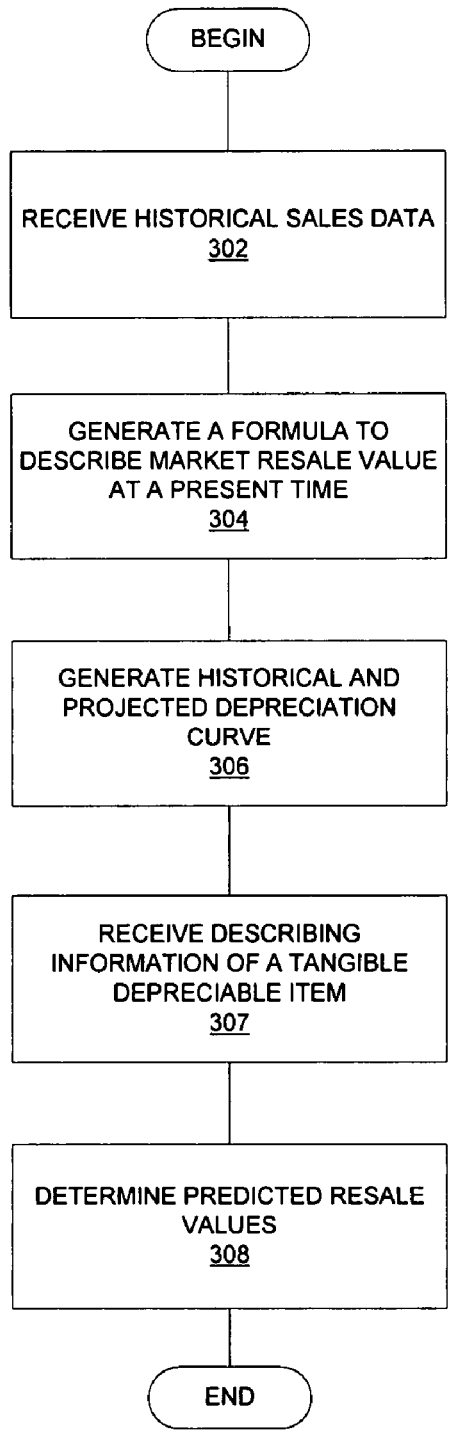
FIG. 3A is a flow diagram illustrating one embodiment of a method for computing a predicted resale value of a tangible depreciating item.
Figure 3B:
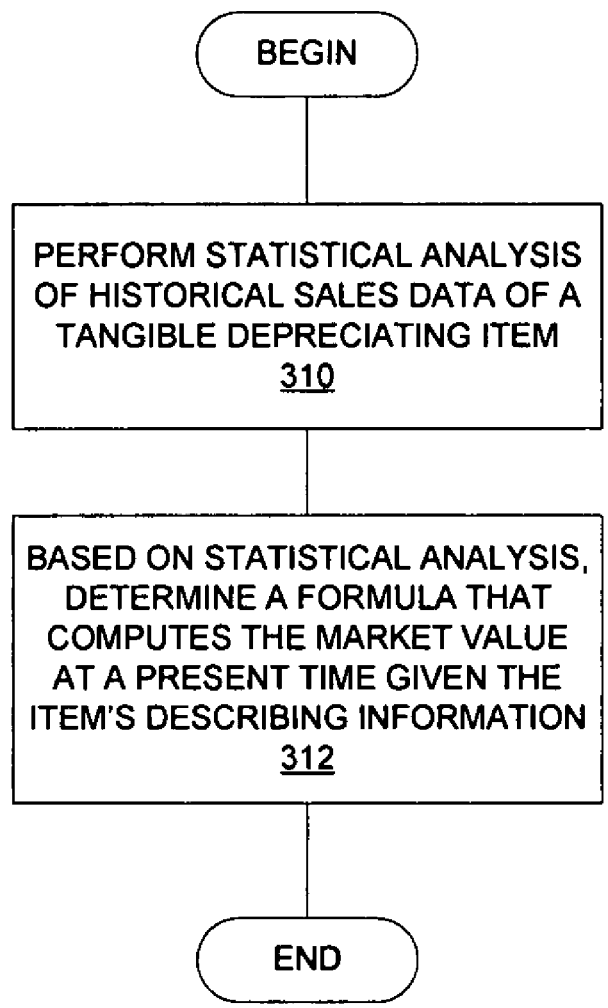
FIG. 3B is a flow diagram illustrating one embodiment of a method for computing a present resale value of the tangible depreciating item of FIG. 3A.

FIG. 3A is a flow diagram illustrating one embodiment of a method for computing a predicted value of a tangible depreciating item. At 302, historical sales data, as previously described in FIG. 1, is received. At 304, the historical sales data is analyzed to generate a formula specific to the type of tangible depreciating item of the type in question (e.g. laptop) that takes as inputs the describing information of the particular item for which an option is being offered and outputs its current resale value. That formula may be used to generate a current market resale value of a tangible depreciating item based on the describing information of the tangible depreciating item. One embodiment of the process for determining this formula is illustrated in FIG. 3B. The analysis is not limited to determining a single formula, but may result in a set of formulae.

Figure 3C:
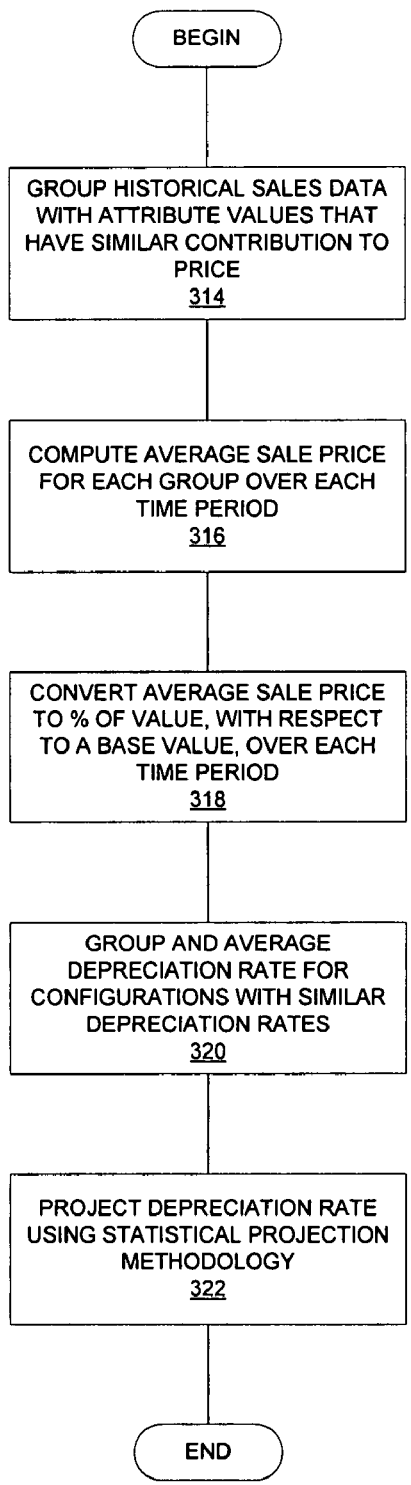
FIG. 3C is a flow diagram illustrating one embodiment of a method for computing a depreciation curve of the tangible depreciating item of FIG. 3A.
Figure 4:
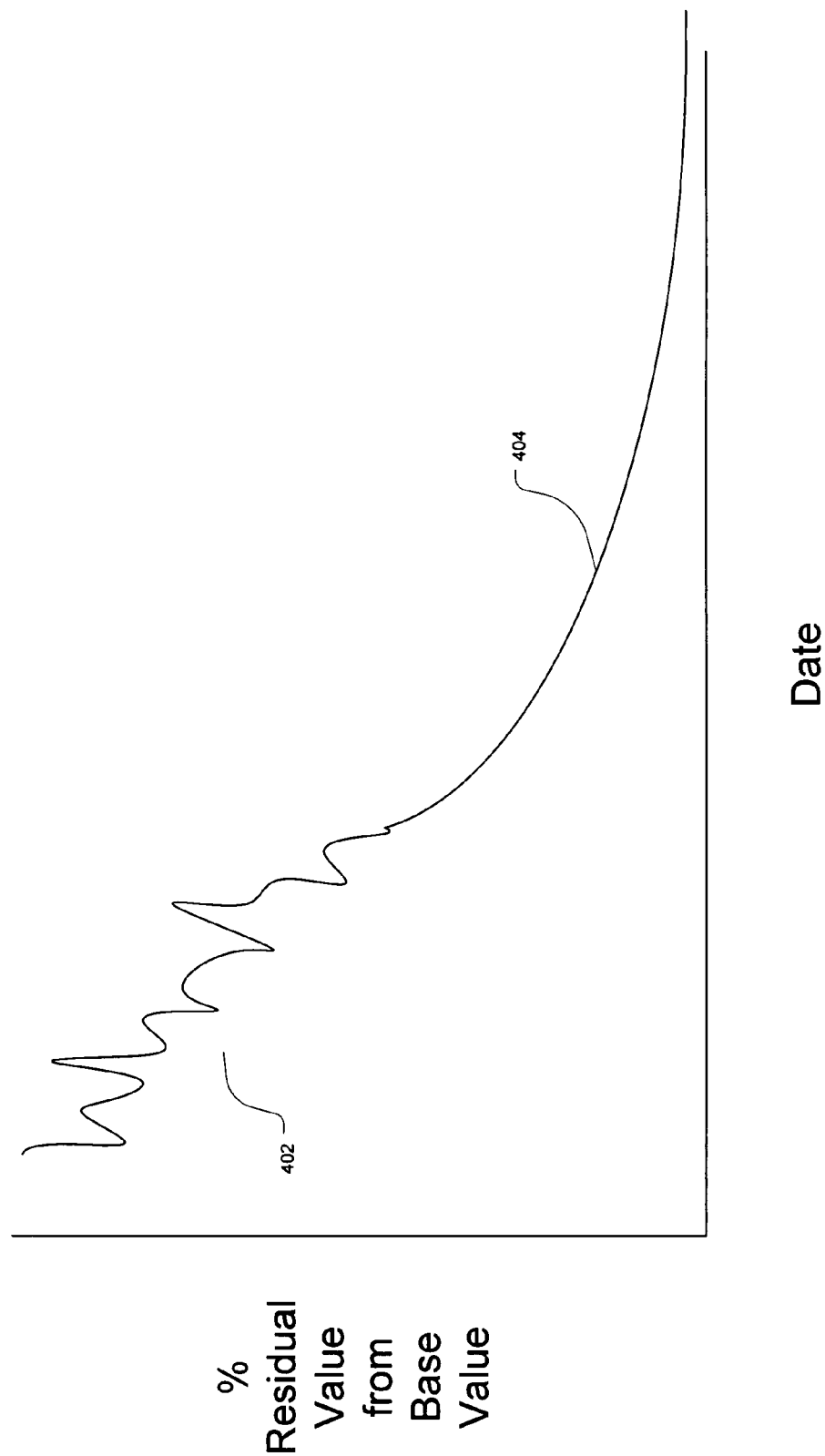
FIG. 4 is a graph diagram illustrating one embodiment of depreciation curve of a tangible depreciating item based on historical data.

At 306, the historical sales data may be used to determine a depreciation rate, curve, or trend for the tangible depreciating item that describes comparative magnitudes of resale values for the item at various points in time, both past and future as illustrated in FIG. 4. In accordance with one embodiment, the past depreciation rate may be used to project and predict a future depreciation rate. The depreciation rate is not limited to a constant, but may instead vary over time. One embodiment for the process for determining the depreciation rate is further described in FIG. 3C.

FIG. 3B is a flow diagram illustrating one embodiment of a method for computing a formula to determine the present resale value of the tangible depreciating item of FIG. 3A given its describing information. The analysis is not limited to determining a single formula, but may result in a set of formulae. At 310, statistical analysis may be performed on the historical sales data of a tangible depreciating item in accordance with well known statistical methods such as hedonic analysis, non-linear regression, generalized linear modeling, and vector auto-regression among others. At 312, based on the analysis, a formula may be determined that takes as inputs the describing information of a tangible depreciating item of the type in question (e.g. laptop, and what kind of laptop) and outputs the present resale value of the item.

FIG. 3C is a flow diagram illustrating one embodiment of a method for computing a depreciation rate of the tangible depreciating item of FIG. 3A. The depreciation rate is not limited to a constant, but may instead vary over time. At 314, historical sales data are grouped as follows into similar configurations: each group of sales should be of items whose attributes have similar contributions to price. For example, if the item is a laptop, microchips of the type Intel Pentium 4 with clock rates 1.6 MHz and 1.7 MHz may contribute substantially the same amount to the resale value of the item. On the other hand, if one microchip is an Intel Pentium 4 and the other is an Intel Pentium II, the value contributions may differ significantly. For sales to be grouped as a similar configuration, each relevant attribute of the items must contribute substantially the same amount to the item's resale value. In other words, the microchips must be substantially the same, the hard disk size must be substantially the same, etc. The reason for grouping sales of configurations with similar contributions to price is to fill gaps in data to produce a depreciation rate since not all configurations are represented in the sales data on any given day.

At 316, each group of sales is separated by time period (e.g. day). The average sale price for the group is then computed over each of the time periods (e.g. find the average price for the group of configurations on each historical day). The result will be a series of average prices over time for each grouped configuration.

At 318, a base value is selected for each grouped configuration. Each of the average prices is divided by this base value to determine a series of percent values with respect to the selected base value over time. The base value may be for example, the average price for an arbitrary chosen time period in the series. This series of values can be thought of as a depreciation curve or residual value curve since it delineates how the configurations belonging to the group have changed in value over time relative to the selected base value. The multiple series of residual values for the various grouped configurations are further grouped. This level of grouping should bring together series of residual values for configurations with similar depreciation rates.

At 320, once grouped, these series of values should be averaged at each time period (e.g. day). For example, if the tangible depreciating item is a laptop, laptops with Intel Pentium M microchips may depreciate at the same rate regardless of brand, hard disk size, etc. This step is intended to smooth out data outliers and provide a representative depreciation curve for the class of items to which it applies.

At 322, the depreciation curve for each class of items is projected into the future using commonly well known statistical projection methodology, for example linear or exponential projection, to determine the depreciation rate or curve. This rate may change over time. It may also be altered to take account of market intelligence relating predicted marketplace trends not visible in the historical data. For example, an announcement of a new laptop microprocessor being released in the near future may affect resale values of laptops with existing microprocessors in a way that could not have been predicted by simply analyzing historical sales data. In this type of situation, the depreciation rate or curve may have to be manually manipulated to take account of the approaching change in value not reflected in the statistical analysis.

FIG. 4 is a graph diagram illustrating one embodiment of a depreciation rate of a tangible depreciating item based on historical sales data. The first portion 402 of the curve is based on historical depreciation data. The second portion 404 of the curve is based on computed projected depreciation as previously described.

Figure 5:
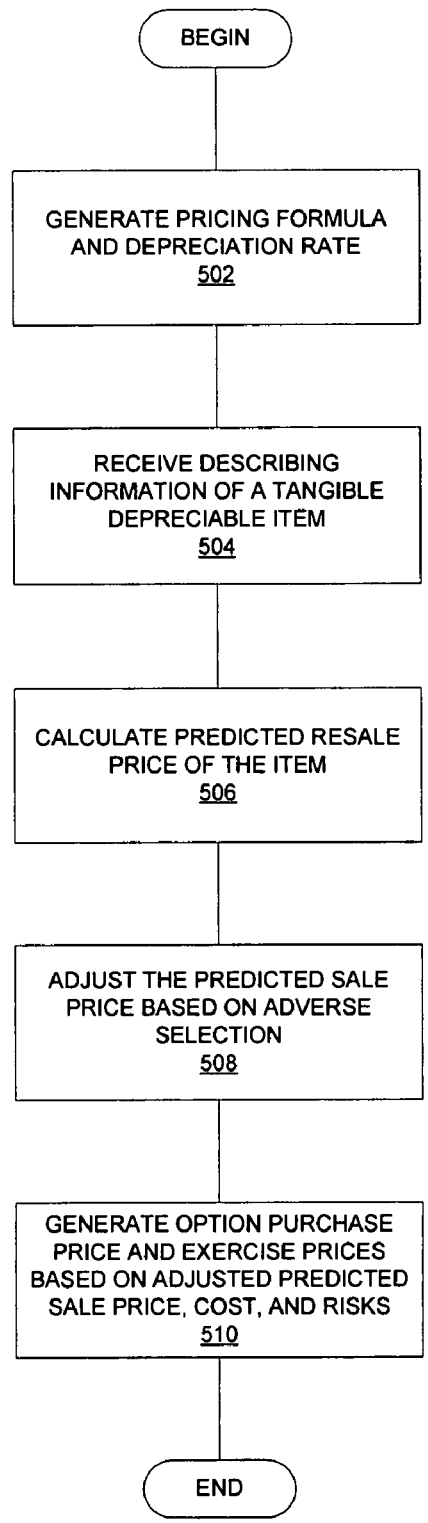
FIG. 5 is a flow diagram illustrating one embodiment of a method for computing exercise prices and a purchase price for a buyback option on a tangible depreciating item.

FIG. 5 is a flow diagram illustrating one embodiment of a method for computing an exercise price for a buyback option on a tangible depreciating item. At 502, pricing formula and depreciation rate are determined as previously described with respect to FIGS. 3B and 3C. At 504, the describing information of a tangible depreciating item is received. This describing information was previously described at 106 of FIG. 1. At 506, using the pricing formula, the depreciation rate, and the describing information of the tangible depreciating item, the predicted resale value of the item is calculated using the method previously described with respect to FIG. 3A. At 508, the predicted sale price may be adjusted based on adverse selection. One embodiment of an adverse selection computation is further described below with respect to FIG. 6. At 510, the purchase price and exercise prices for the buyback option are generated based on the adjusted predicted sale price, operational costs, and the risk involved in offering the option.

Figure 6:
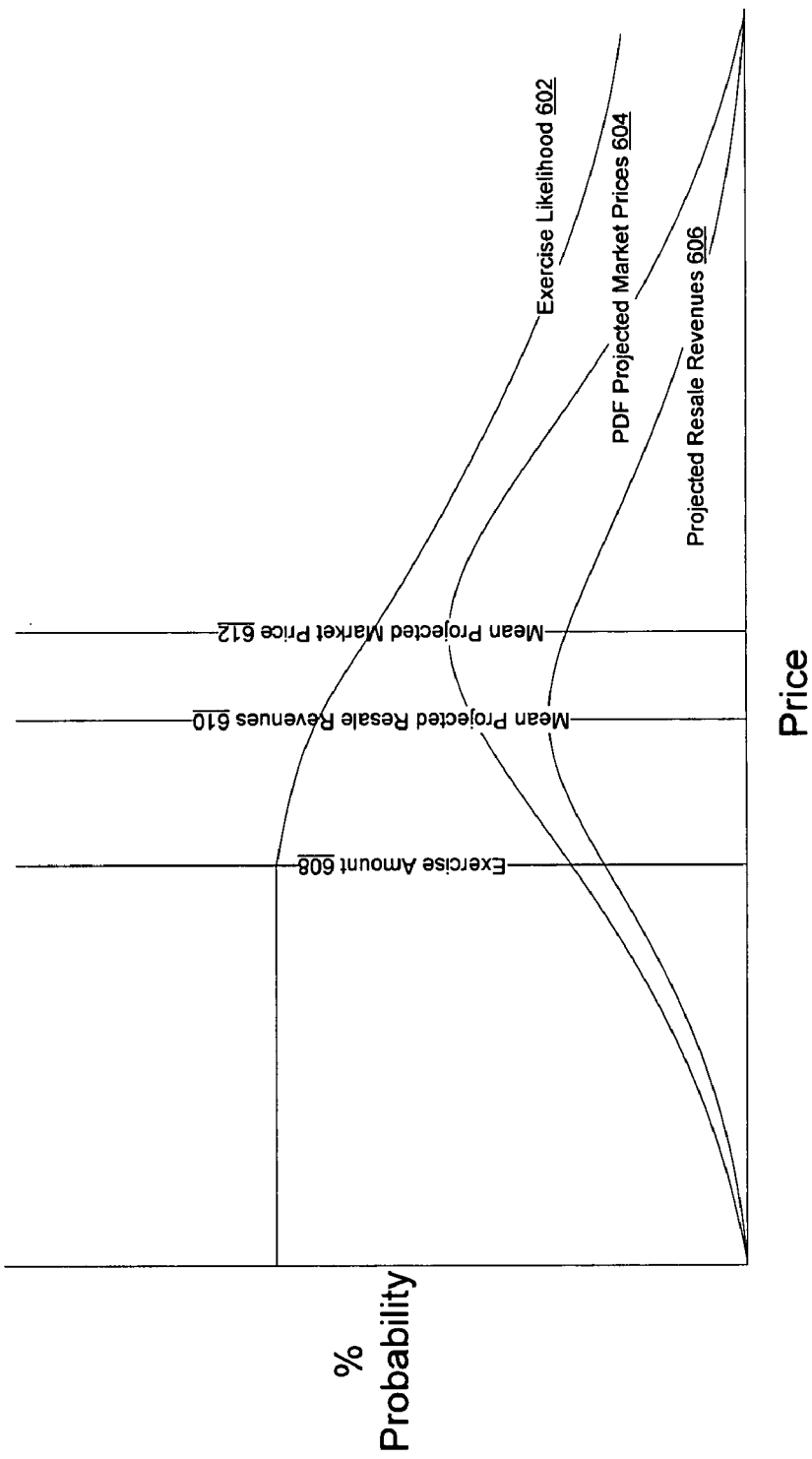
FIG. 6 is a graph diagram illustrating one example of the method for computing the purchase price and exercise price of FIG. 5.

FIG. 6 is a graph diagram illustrating one example of the effects of adverse selection on the method for computing the exercise price of FIG. 5. A projected market price curve 604 includes a mean projected market price 612. An exercise likelihood curve 602 depends on the exercise price 604. As illustrated, as the price of an item increases, a customer is less likely to redeem that item or exercise his option. By combining both the projected market price curve 604 and the exercise likelihood curve 602, a projected resale revenue curve 606 is generated. The projected resale revenue curve 606 includes a mean projected resale revenue 610. The difference between the projected resale revenue 606 and the mean projected market price 612 is the adverse selection cost incurred by allowing the customer to decide whether or not to exercise the buyback option.

Figure 7:
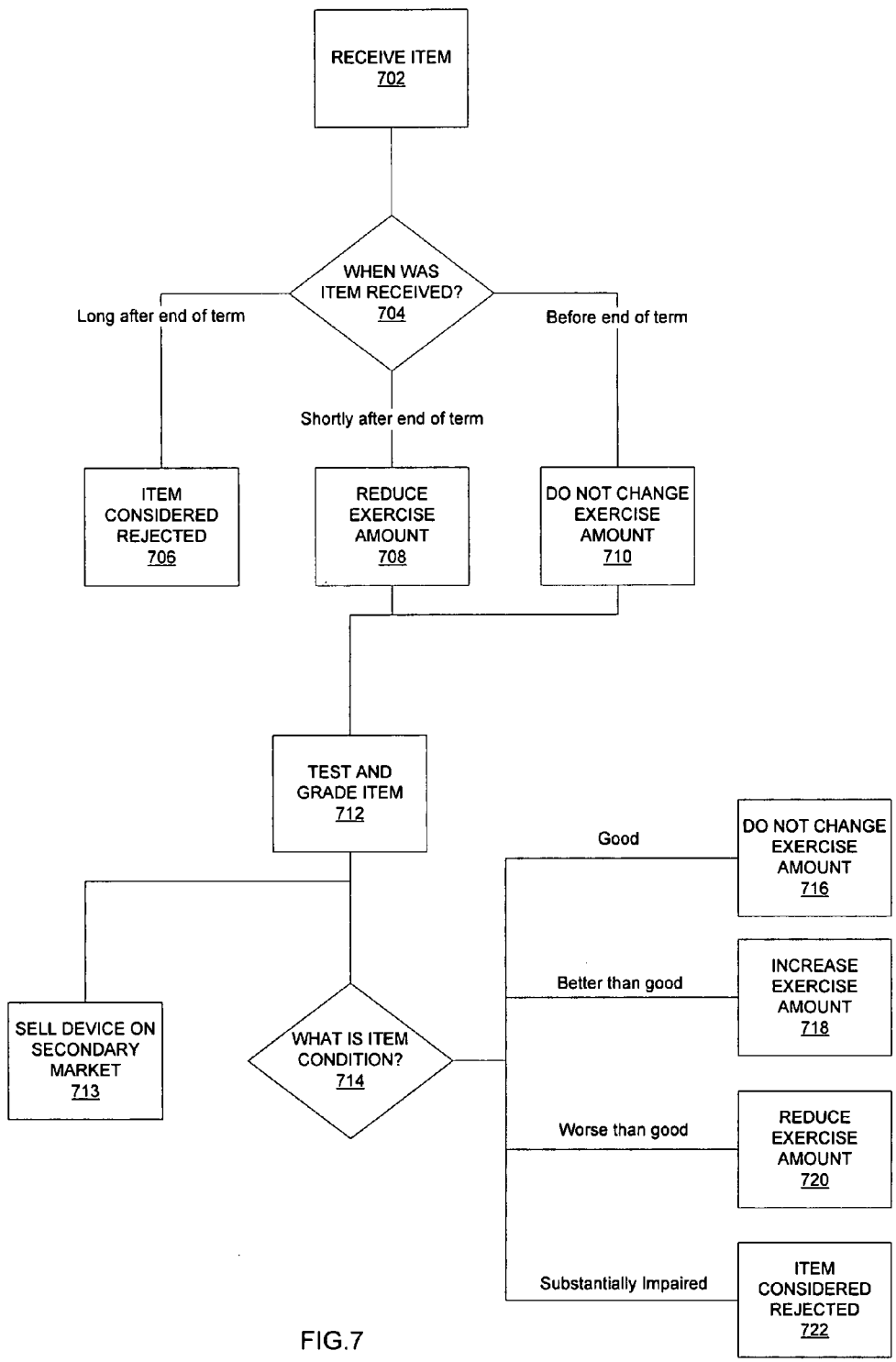
FIG. 7 is a flow diagram illustrating a method for adjusting the exercise price based on a condition of the tangible depreciating item at the time of exercise.

FIG. 7 is a flow diagram illustrating one embodiment of a method for adjusting the exercise price based on a condition of the tangible depreciating item at the time of exercise. In this embodiment, an item with an associated option is received 702. The time the item is received or postmarked is compared to the term associated with the option at 704. If the item is received long after the end of the term, the item is considered rejected at 706. If the item is received shortly after the end of the term, the exercise amount is reduced at 708. If the item is received before the end of the term, the exercise amount is not changed at 710. If the time is received before the end of the term, or shortly after, the item is then tested and graded at 712, and then sold on a secondary market at 713. The item condition determines additional adjustments made to the exercise price at 714. If the item is graded to be in a baseline condition of "good" or a substantially similar category, the exercise price is not changed at 716. If the item is graded better than the baseline category, then the exercise amount is increased at 718. If the item is graded worse than the baseline category, then the exercise amount is decreased at 720. If the item is grade to be not in working condition, substantially impaired, or a substantially similar category, then it is considered rejected at 722. Rejected items can have their exercise price reduced as low as zero.

Figure 8:
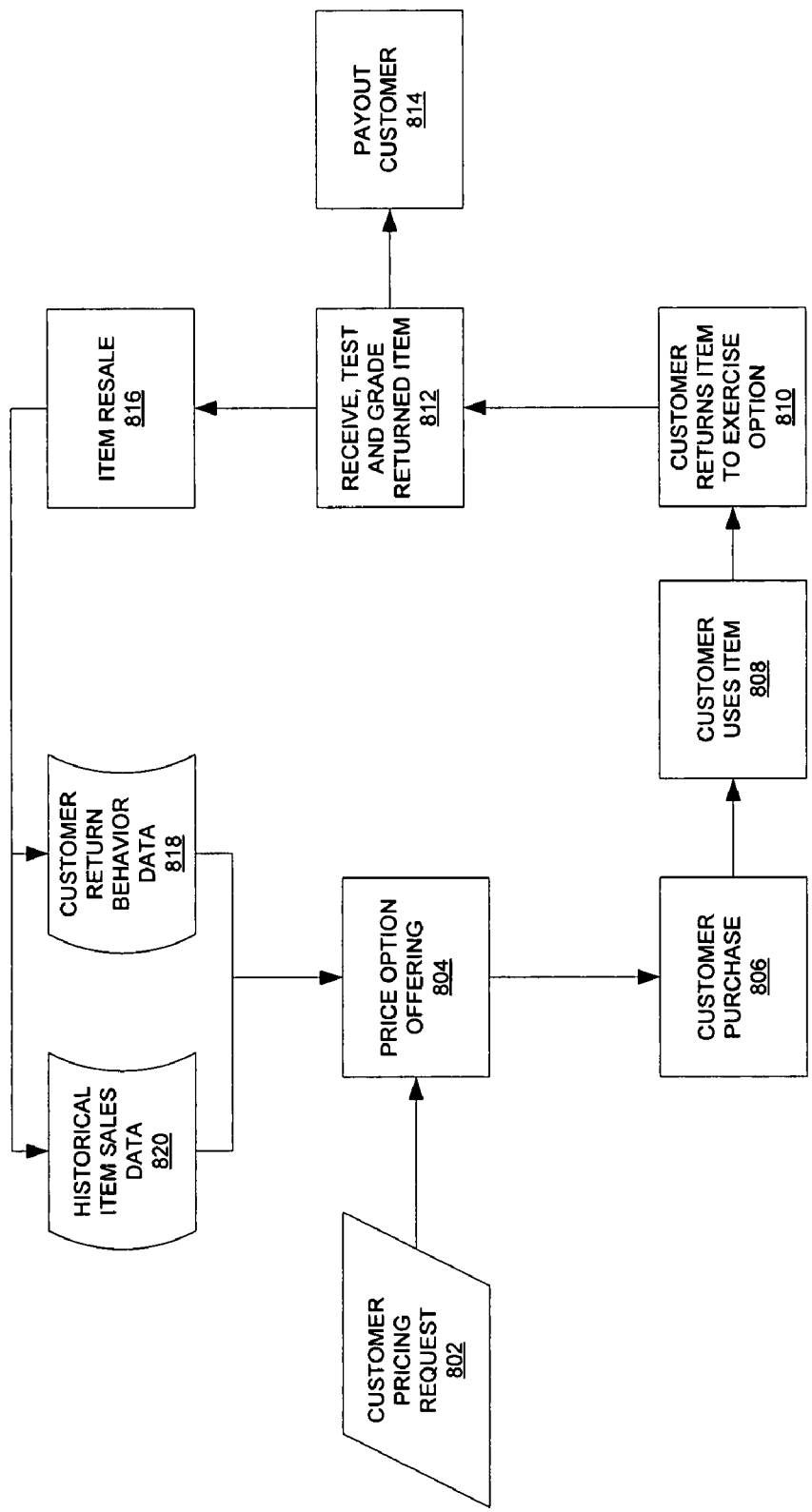
FIG. 8 is a flow diagram illustrating another embodiment of a method for computing a buyback option on a tangible depreciating item.

FIG. 8 is a flow diagram illustrating one embodiment of the lifecycle of a customer who purchases and exercises an option on a tangible depreciating item. The customer requests pricing for an option (as previously described) at 802, and is presented with a price for the upfront fee associated with the option at 804. The customer purchases the option at 806, and uses the item for a period of time at 808. The customer then exercises the option by returning the item at 810. The item is then received from the customer, tested, and graded at 812. The customer is then paid the appropriate amount at 814. The item is then resold on a secondary market at 816. Customer return behavior data may be recorded at 818. Historical item sales data may be recorded at 820. These recorded data may be used as feedback to aid the pricing of future options 804.

Figure 9:
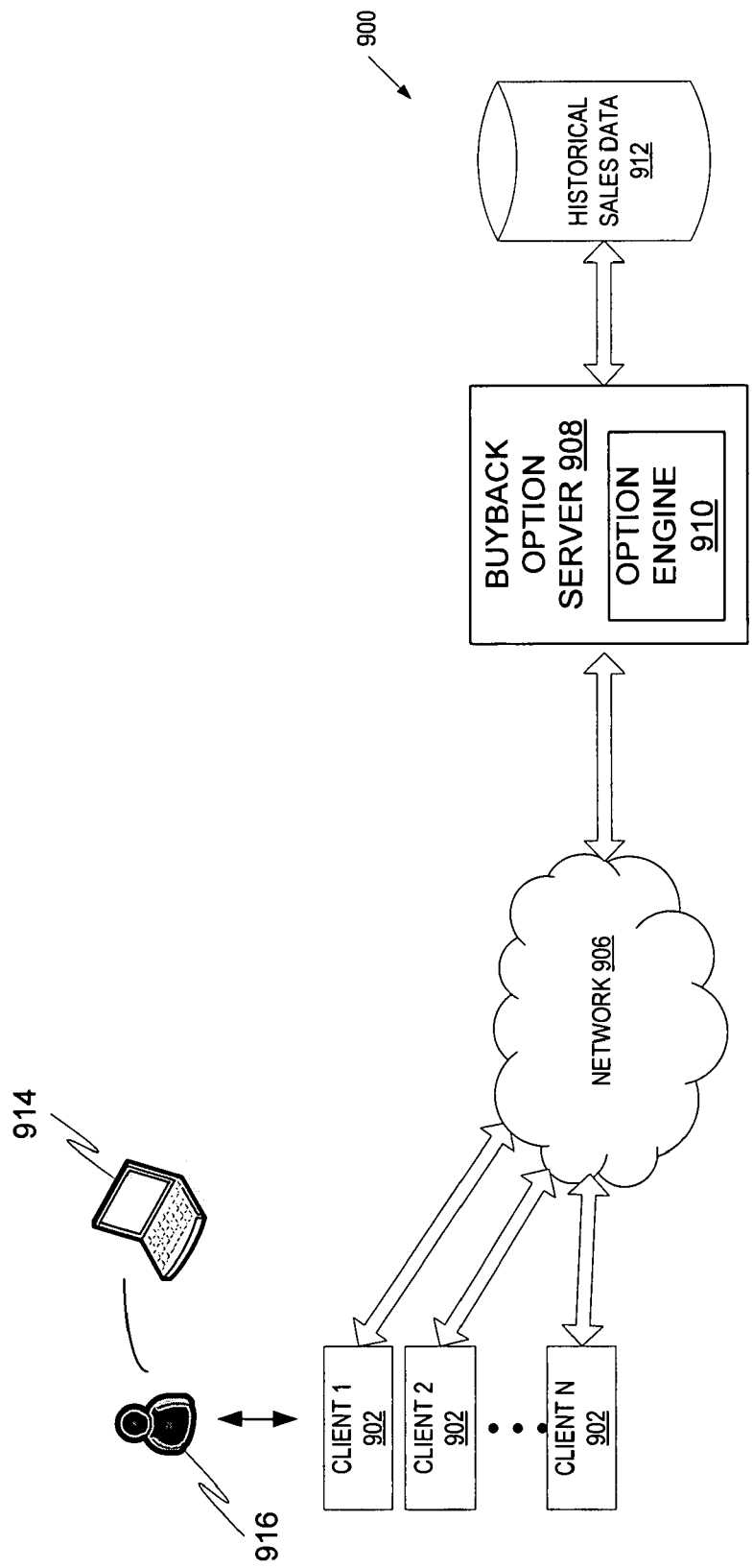
FIG. 9 is a block diagram of one embodiment of a system for offering a buyback option for a tangible depreciating item.

FIG. 9 is a block diagram of one embodiment of a network architecture 900 for offering a buyback option for a tangible depreciating item. The network architecture 900 may include client devices (clients) 902, a buyback option server 908 and a network 906.

Clients 902 may be, for example, personal computers (PCs), mobile phones, palm-sized computing devices, personal digital assistants (PDAs), etc. Clients 902 are coupled to the buyback option server 908 via the network 906, which may be a public network (e.g., Internet) or a private network (e.g., Ethernet or a local area Network (LAN)). A user 916 may communicate information about a tangible depreciating item 914 to buyback option server 908 with clients 902.

The buyback option server 908 may contain a buyback option engine for computing upfront fees and option pricing schemes based on input received from clients 902. Server 908 may retrieve and store historical sales data 912 from various sources online and offline. For example, online sources may include auction marketplaces such as eBay. Offline sources may include conventional newspaper advertisements.

In one embodiment, clients 902 communicate with the buyback option server 908 via a web server (not shown). For example, clients 902 may host web browsers that communicate with the web server using HTTP to request information. The web server may then communicate with buyback option server 908 to determine the pricing of a buyback option on the tangible depreciating item 914.

Historical sales data 912 may be part of the buyback option server 908, or it may reside externally (e.g., on a database server). Server 908 may be a single server or a cluster of servers.

Figure 10:
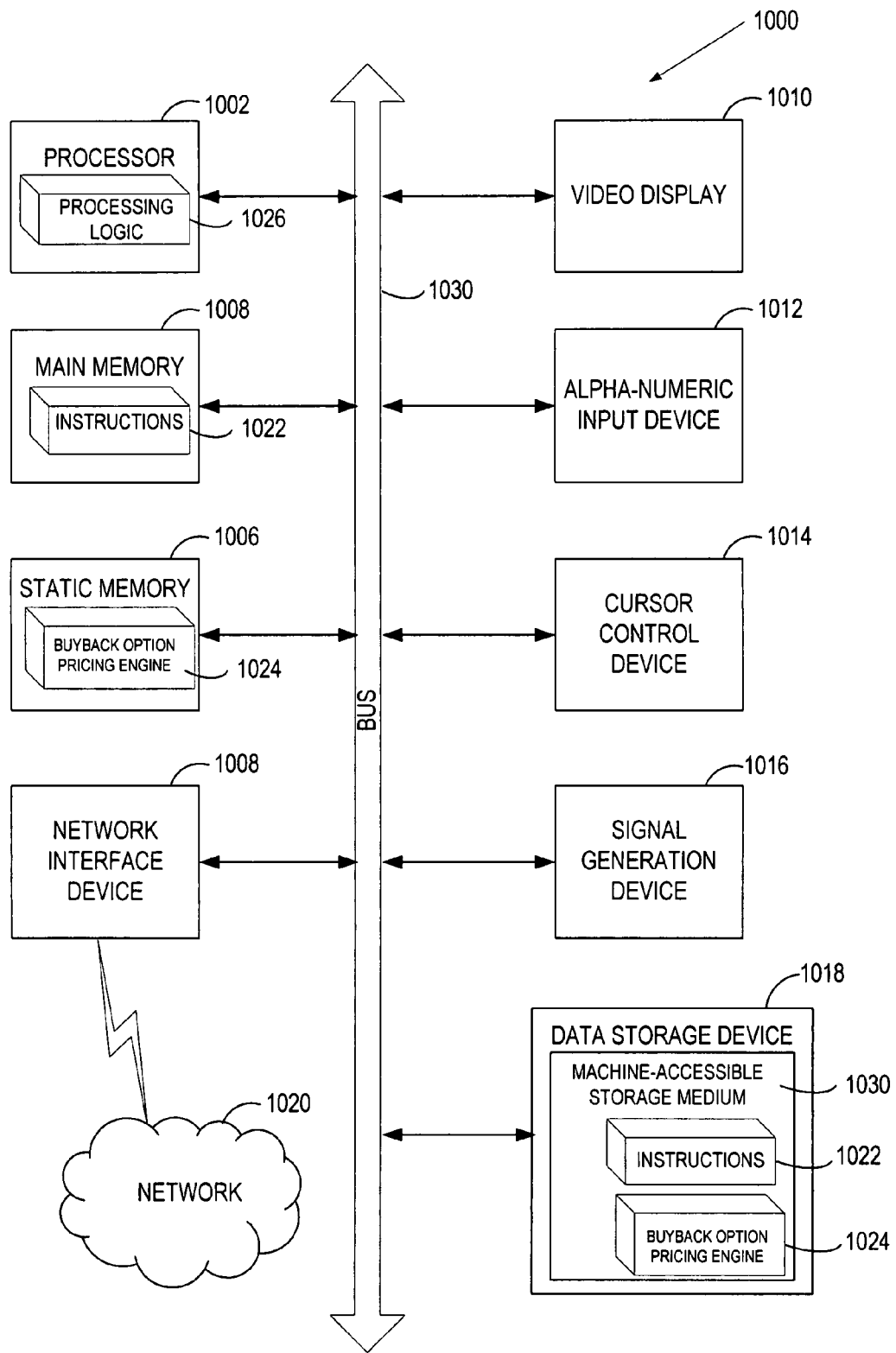
FIG. 10 is a block diagram of an exemplary computing system for offering a buyback option for a tangible depreciating item.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1030 on which is stored one or more sets of instructions (e.g., software 1022) embodying any one or more of the methodologies or functions described herein. The software 1022 may also reside, completely or at least partially, within the main memory 1004 and/or within the processing device 1002 during execution thereof by the computer system 1000, the main memory 1004 and the processing device 1002 also constituting machine-accessible storage media. The software 1022 may further be transmitted or received over a network 1020 via the network interface device 1008.

The machine-accessible storage medium 1030 may also be used to store the buyback option computation engine 1024.

Buyback option computation engine 1024 may also be stored in other sections of computer system 1000, such as static memory 1006.

While the machine-accessible storage medium 1030 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 11:
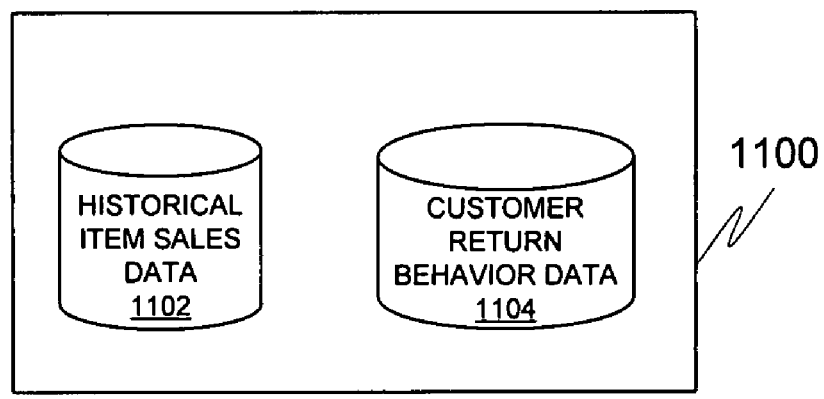
FIG. 11 is a block diagram of a database of the computing system of FIG. 10.

FIG. 11 is a block diagram of one embodiment of a database of the computing system of FIG. 10. The computing system 1100 comprises a database which contains historical item sales data 1102 and a database which comprises customer return behavior data 1104. The historical item sales data 1102 comprises describing information of sold tangible depreciating items, corresponding resale prices, or corresponding sale dates. The customer return behavior data 1104 comprises rates at which customers exercise their buyback options, the dates at which customers exercise their options and the corresponding length of time since the purchase of the option, or the condition of items exchanged when exercising the option.

Figure 12:
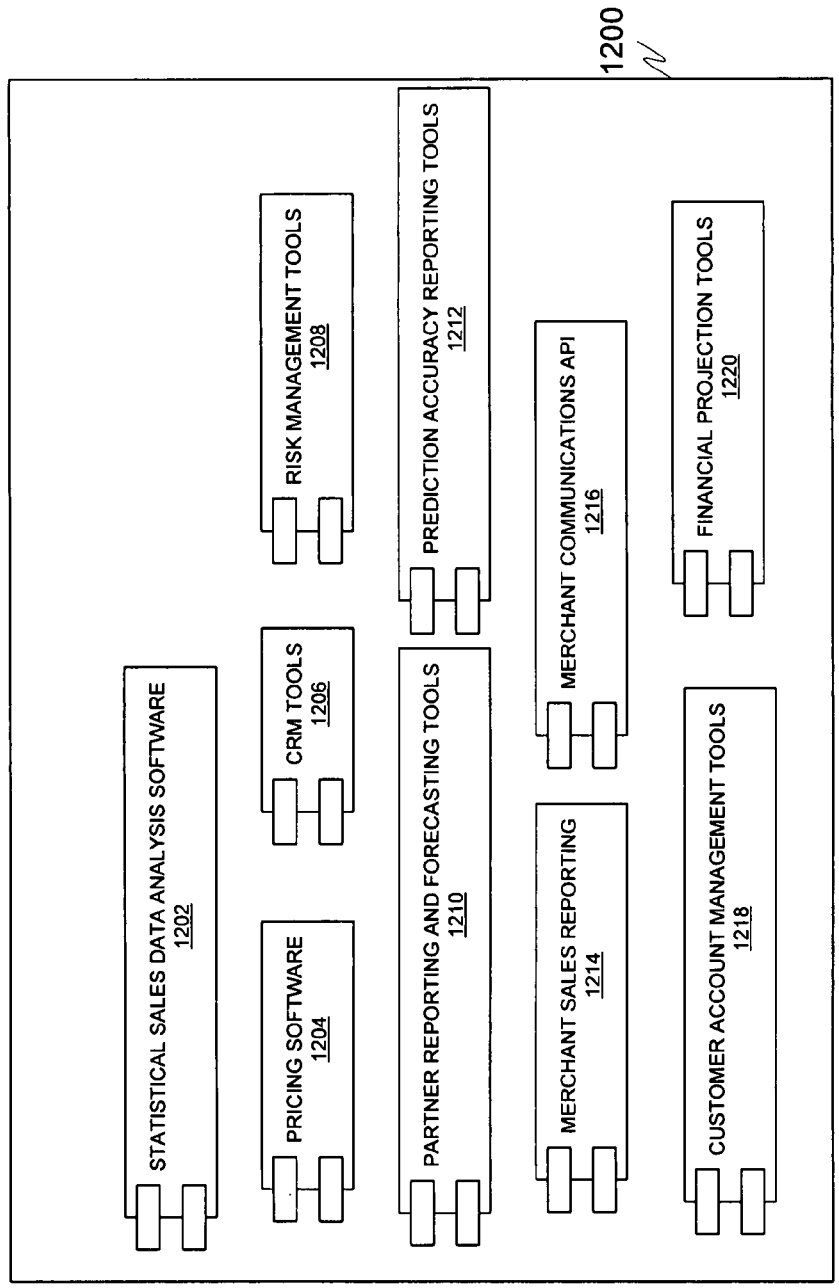
FIG. 12 is a block diagram of software components of the computing system of FIG. 10.

FIG. 12 is a block diagram of one embodiment of software components of the computing system of FIG. 10. The computing system 1200 is comprised of software components that comprise statistical data analysis software 1202, pricing software 1204, customer relationship management tools 1206, risk management tools 1208, partner reporting and forecasting tools 1210, prediction accuracy reporting tools 1212, merchant sales reporting 1214, merchant communications application programming interface 1216, customer account management tools 1218, or financial projection tools 1220.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for computing a put option on a purchased tangible depreciating item, comprising:

computing at a server, a one-time put option fee received from an owner of the purchased tangible depreciating item, based on characteristics of the purchased tangible depreciating item, in exchange for granting the owner of the purchased tangible depreciating item the right to exchange the purchased tangible depreciating item over a predetermined period of time for the one-time put option fee, wherein the one-time put option fee is based on a predicted future resale value of the purchased tangible depreciating item, the one-time put option fee being a one-time purchase price for the put option on the purchased tangible depreciating item.

2. The method of claim 1 further comprising:

receiving the purchased tangible depreciating item at the date of exercise;

adjusting the predetermined amount based on the condition of the purchased tangible depreciating item at the date of exercise; and disbursing an amount based on the adjusted predetermined amount at the date of exercise.

3. The method of claim 1, further comprises determining the predicted future resale value of the purchased tangible depreciating item, determining the predicted future resale value of the purchased tangible depreciating item further comprising:

acquiring historical sales data of sold tangible depreciating items;

determining a present resale value of the purchased tangible depreciating item based on the historical sales data;

extrapolating a depreciation rate, using relative values, of sold tangible depreciating items having similar characteristics as the purchased tangible depreciating item; and computing the predicted value of the purchased tangible depreciating item based on the present resale value and the depreciation rate.

4. The method of claim 3 wherein the historical sales data further comprises data from auction marketplaces, data from used goods marketplaces, or data from new goods marketplaces.

5. The method of claim 1 wherein the purchaser is required to exchange the purchased tangible depreciating item at the future date for the predetermined amount.

6. A computer-implemented method comprising:

determining a plurality of attributes of a purchased tangible depreciating item at a server;

collecting historical sales data of sold tangible depreciating items in storage device coupled to the server;

determining a present resale value of the purchased tangible depreciating item based on the historical sales data and attributes of the purchased tangible depreciating item;

extrapolating a depreciation rate of sold tangible depreciating items having similar attributes as the purchased tangible depreciating item;

computing a future resale value of the purchased tangible depreciating item based on the present resale value and on the depreciation rate;

computing a one-time purchase price for an option on the purchased tangible depreciating item;

computing an exercise price for the purchased tangible depreciating item based on the predicted future resale value of the purchased tangible depreciating item; and adjusting the exercise price based on the condition of the purchased tangible depreciating item at the time of exercise of the option.

7. The method of claim 6 further comprising:

incorporating customer return behavior data in computing the purchase price and exercise price at the time of the option purchase.

8. The method of claim 6 wherein historical sales data comprise attributes of sold tangible depreciating items, corresponding sale prices, or corresponding sale dates.

9. The method of claim 6 wherein the plurality of attributes comprise a type of the purchased tangible depreciating item, a model of the purchased tangible depreciating item, or a configuration of the purchased tangible depreciating item.

10. The method of claim 6 wherein extrapolating the depreciation rate incorporates market intelligence outside of the historical sales data.

11. An article of manufacture comprising:
a machine-accessible storage medium including data that, when accessed by a machine, cause the machine to perform a method comprising:
determining a plurality of attributes of a purchased tangible depreciating item;
collecting historical sales data of sold tangible depreciating items;
determining a present resale value of the purchased tangible depreciating item based on the historical sales data and attributes of the purchased tangible depreciating item;
extrapolating a depreciation rate of sold tangible depreciating items having similar attributes as the purchased tangible depreciating item;
computing a future resale value of the purchased tangible depreciating item based on the present resale value and on the depreciation rate;
computing a one-time purchase price for an option on the purchased tangible depreciating item;
computing an exercise price for the purchased tangible depreciating item based on the predicted future resale value of the purchased tangible depreciating item; and
adjusting the exercise price based on the condition of the purchased tangible depreciating item at the time of exercise of the option,
wherein the purchased tangible depreciating item comprises a consumer electronic device.

12. The method of claim 11 further comprising:
incorporating customer return behavior data in computing the purchase price and exercise price at the time of option purchase.

13. The method of claim 10 wherein historical sales data comprises attributes of sold tangible depreciating items, corresponding sale prices, or corresponding sale dates.

14. The method of claim 10 wherein the plurality of attributes comprise a type of the purchased tangible depreciating item, a model of the purchased tangible depreciating item, or a configuration of the purchased tangible depreciating item.

15. An apparatus comprising:
a server
to determine a plurality of attributes of a purchased tangible depreciating item,
to collect historical sales data of sold tangible depreciating items,
to determine a present resale value of the purchased tangible depreciating item based on the historical sales data and attributes of the purchased tangible depreciating item,
to extrapolate a depreciation rate of sold tangible depreciating items having similar attributes as the purchased tangible depreciating item,
to compute a future resale value of the purchased tangible depreciating item based on the present resale value and on the depreciation rate,
to compute a one-time purchase price for an option on the purchased tangible depreciating item,
to compute an exercise price for the purchased tangible depreciating item based on the predicted future resale value of the purchased tangible depreciating item, and
to adjust the exercise price based on the condition of the tangible depreciating item at the time of exercise of the option, wherein the purchased tangible depreciating item comprises a consumer electronic device.

16. The apparatus of claim 15 wherein the server is to further incorporate customer return behavior data in computing the purchase price and exercise price at the time of option purchase.

17. The apparatus of claim 15 wherein historical sales data comprises attributes of sold tangible depreciating items, corresponding sale prices, or corresponding sale dates.

18. The apparatus of claim 15 wherein the plurality of attributes comprises a type of the purchased tangible depreciating item, model of the purchased tangible depreciating item, or a configuration of the purchased tangible depreciating item.

* * * * *